United States Patent

[11] 3,577,073

[72] Inventor Seymour R. Cray
Chippewa Falls, Wis.
[21] Appl. No. 800,105
[22] Filed Feb. 18, 1969
[45] Patented May 4, 1971
[73] Assignee Control Data Corporation
Minneapolis, Minn.

[54] APPARATUS FOR AUTOMATED COMPUTER MAINTENANCE COMPRISING MEANS FOR VARYING THE INPUT SIGNAL SWITCHING THRESHOLD VOLTAGE FOR ANY OF A PLURALITY OF ELECTRONIC CIRCUITS
7 Claims, 8 Drawing Figs.

[52] U.S. Cl. .......... 324/73, 307/215, 307/255
[51] Int. Cl. .......... G01r 15/12
[50] Field of Search .......... 324/73; 307/241, 242, 243, 244, 255, 215

[56] References Cited
UNITED STATES PATENTS

| | | | |
|---|---|---|---|
| 3,132,304 | 5/1964 | Lukoff .......... | 324/73 |
| 3,160,766 | 12/1964 | Reymond .......... | 307/255 |
| 3,168,697 | 2/1965 | Humphrey, Jr. .......... | 324/73 |
| 3,433,978 | 3/1969 | Bongenaar et al. .......... | 307/255 |

*Primary Examiner*—Rudolph V. Rolinec
*Assistant Examiner*—R. J. Corcoran
*Attorney*—Paul L. Sjoquist

ABSTRACT: An apparatus for providing the automated maintenance checkout of large-scale computers by selectively stressing the operating voltage margins of any of the plurality of electronic logic modules comprising the computer is disclosed. The selective stressing is accomplished under the control of an auxiliary data processing system.

INVENTOR.
SEYMOUR R. CRAY
BY Thomas G. Devine

INVENTOR.
SEYMOUR R. CRAY
BY Thomas G. Dawnie

INVENTOR.
SEYMOUR R. CRAY
BY Thomas G. Devine

INVENTOR.
SEYMOUR R. CRAY
BY Thomas G. Devine

INVENTOR.
SEYMOUR R. CRAY
BY Thomas G. Devine

INVENTOR.
SEYMOUR R. CRAY
BY Thomas G. Devine

INVENTOR.
SEYMOUR R. CRAY
BY Thomas D. Dernie

APPARATUS FOR AUTOMATED COMPUTER MAINTENANCE COMPRISING MEANS FOR VARYING THE INPUT SIGNAL SWITCHING THRESHOLD VOLTAGE FOR ANY OF A PLURALITY OF ELECTRONIC CIRCUITS

This invention relates to an apparatus for providing the automated maintenance checkout of large-scale computers by selectively stressing the operating voltage margins of the switching circuits which comprise the computer. These switching circuits are typically combined in predetermined groups and physically housed in logic circuit modules. The modules are electrically interconnected through connector pins and back panel wiring.

It is contemplated that the novel features of this invention will be practiced by selectively stressing all of these switching circuits contained within a particular electronic circuit module at the same time. This enables the detection and replacement of a circuit module whenever a weak or defective circuit is discovered within it. Since each of the electronic circuit modules have a particular physical location on the computer, it also enables a location addressing scheme to be devised which can be implemented by a data processing system. The data processing system can then locate and selectively test any of the plurality of electronic circuit modules which comprise a large-scale digital computer.

The electronic switching circuits of the type which this invention is intended to cooperate with are described in the U.S. Pat. No. 3,535,546, issued to L. T. Davis, entitled "Current Mode Logic," and assigned to the same assignee as the present application. The circuits of the type described therein have the requirement that a predetermined reference voltage be supplied to set the voltage level about which the switching action takes place. The Davis patent describes a reference voltage level of −1.2 volts, and adopts a digital logic voltage convention whereby the voltage representation for a binary 0 and 1 are represented ±0.4 volts from this reference voltage value. The present application however, finds utility in any computer application having the requirement of a reference voltage supply from which the logic voltage representations are determined and measured.

An object of this invention is to provide a means for stressing the operating voltage limits of a switching circuit to detect weak or malfunctioning circuit components.

Another object of this invention is to provide a means for locating and isolating malfunctioning computer switching circuits.

A further object of this invention is to provide a means for automatically testing all of the circuits in a digital computer in a predetermined manner.

Yet another object of this invention is to provide a means for automatically testing digital computer circuits at high speed in order to minimize the time required for performance of the tests.

Still another object of this invention is provide a means for testing digital computer circuits while not interfering with the normal usage of the circuits in the performance of data processing functions.

Still another object of this invention is to provide an automated means for testing digital computer circuits while the computer under test is executing an independent computer program.

The foregoing and other objects and advantages of the invention will appear more fully hereinafter from a consideration of the detailed description which follows, taken together with the accompanying drawings wherein a preferred embodiment of the invention is illustrated by way of example. It is to be understood, however, that the drawings are for illustration purposes only and are not to be construed as defining the limits of the invention.

FIG. 1*a* is a pictorial representation of a large-scale digital computer; FIG. 1*b* is a pictorial representation of a chassis of the computer shown in FIG. 1*a* and illustrates the arrangement of the individual logic circuit modules.

Figure 1B:
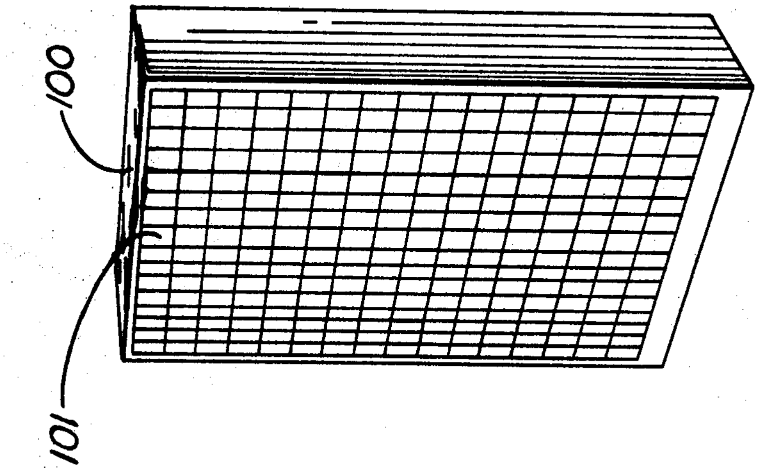
Figure 1A:
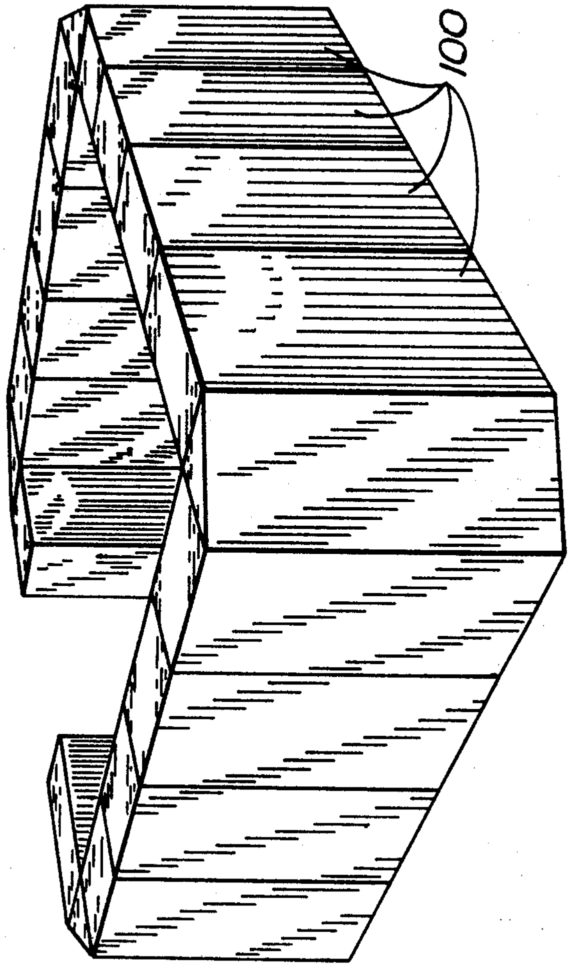

The pictorial representation of a large-scale digital computer illustrated in FIG. 1*a* shows 14 adjacent chassis assemblies which comprise the computer. These chassis assemblies are typically interconnected by means of twisted-pair wires (not shown). Although the chassis assemblies have a similar external appearance, their logic circuit module and wiring combinations are unique and diverse to enable the performance of a plurality of computer functions and to assure the cooperation of all of these functions to provide a useful data processing system.

FIG. 1*b* illustrates a typical chassis 100, expanded so as to more clearly show the individual logic circuit modules 101. The modules 101 are arranged in horizontal rows and vertical columns which can be numerically identified and addressed by the invention described herein. In the preferred embodiment of FIG. 1*b* there are 16 logic modules 101 in each horizontal row and 16 in each vertical column. This arrangement allows a convenient subdivision of the chassis and circuit modules into eight by eight quadrants and simplifies the addressing scheme which will be hereinafter described.

Figure 2:
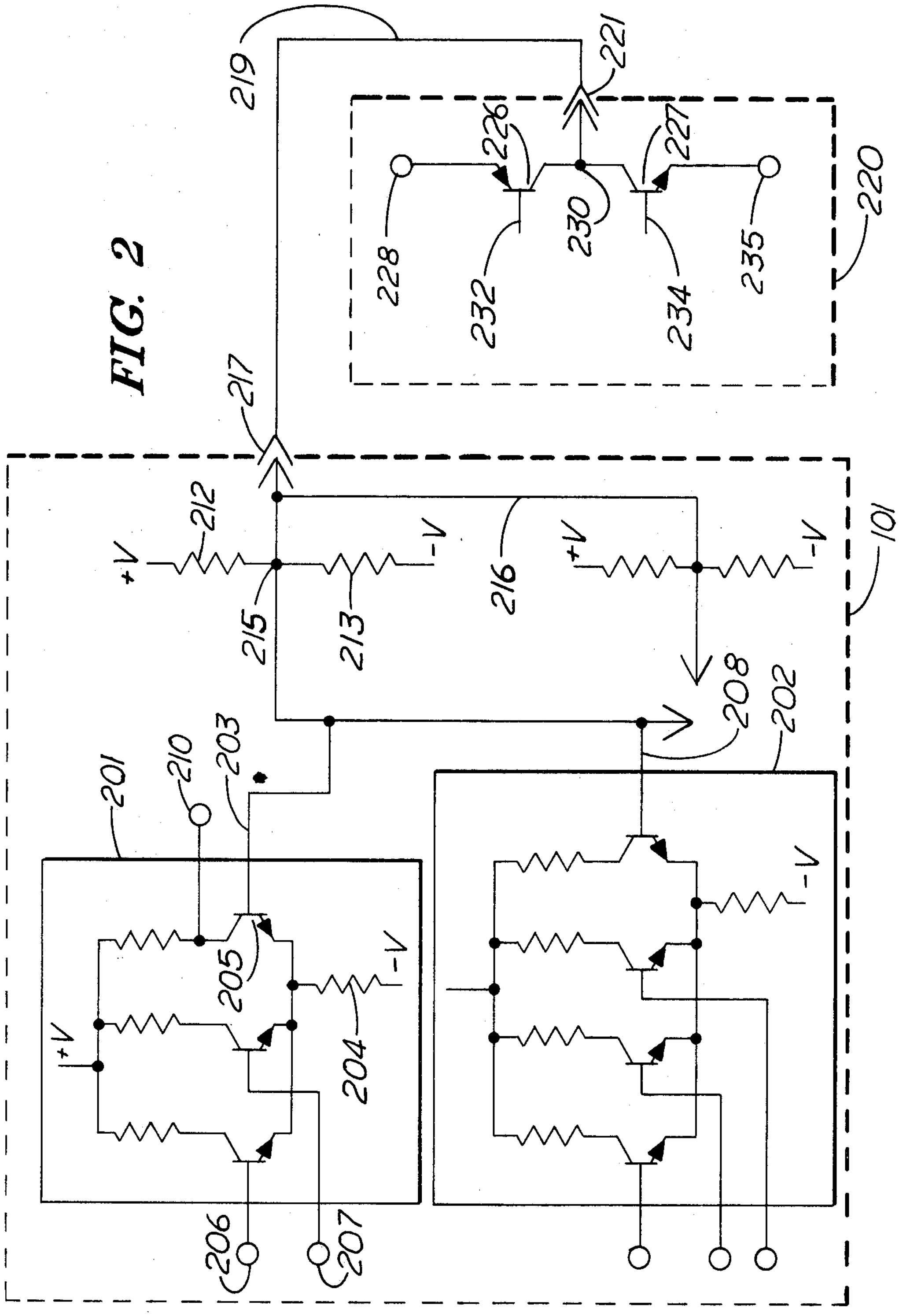
FIG. 2 is a diagrammatic representation of a typical computer current mode logic circuit together with a simplified reference voltage circuit.

FIG. 2 illustrates two typical current mode logic circuits 201 and 202 within a logic circuit module 101. Circuit module 101 preferably has dozens of current mode circuits housed within it, arranged on a plurality of printed circuit boards, and interconnected to perform particular computer logic functions. Each current mode logic circuit has a reference voltage input line such as reference voltage input line 203 for circuit 201. Reference voltage input 203 holds transistor 205 nonconducting if either of the two transistors connected to inputs 206 and 207 are conducting. When the signals at inputs 206 and 207 are such as to cause both connected transistors to become nonconducting the current through resistor 204 drops, and the voltage at the emitter of transistor 205 becomes more negative. Transistor 205 becomes conducting when the emitter voltage drops below the reference voltage applied to input 203, thereby producing a voltage change at output terminal 210. Output terminal 210 is connected to other current mode logic circuits to perform logic functions as required within the logic circuit module 101. It can be seen that the voltage magnitudes at logic voltage inputs 206 and 207 that the voltage magnitudes at logic voltage inputs 206 and 207 that are required to cause transistor 205 to either conduct or nonconduct are primarily determined by the magnitude of the reference voltage applied to reference voltage input 203. If the voltage at input 203 is shifted upward or downward the logic voltage requirements at inputs 206 and 207 shift correspondingly. Therefore it can be appreciated that a shifting of the voltage magnitude at reference voltage input 203 can provide a means for stressing the circuit and detecting marginal components or logic voltage values. If, for example, the nominal reference voltage value at input 203 were −1.2 volts and nominal logic voltage values at inputs 206 and 207 were −1.6 volts or 0.8 volts for a binary 1 or 0 respectively, the shifting of the reference voltage value at input 203 by a few tenths of a volt provides a good test for the presence of marginal logic voltage values at inputs 206 or 207. If a marginal logic voltage value were present at either input 206 or 207 the current mode logic circuit would not operate properly at a stressed reference voltage value and the circuit's logic function would likewise not be performed properly. The improper performance of a logic function can be detected by the data processing system when the system is operated under the control of specialized maintenance programs designed for that purpose.

The reference voltage value applied to input 203 in FIG. 2 is determined by a resistor divider network comprised of resistors 212 and 213. These resistors are chosen to be of suitable value to provide a nominal −1.2 volts at resistor divider connection point 215. This voltage is applied to reference voltage input 203, as well as to other reference voltage inputs such as input 208 on circuit 202. A given resistor divider network can provide a reference voltage supply for several current mode logic circuits. However, because of the large number of current mode logic circuits housed within a logic circuit module 101, a plurality of resistor divider networks are required for each logic circuit module. These resistor divider networks are typically arranged so that all resistor divider networks within a logic circuit module have the reference voltage connection points interconnected as illustrated in FIG. 2 by line 216. This interconnection insures that all reference voltages supplied to circuits within a given module 101 are of equal value and can be varied by a single input to the module.

FIG. 2 also illustrates a simplified voltage margin driver circuit 220. Circuit 220 is connected to the resistor divider connection point 215 on circuit module 101 by means of connection line 219. Since circuit 220 is typically housed in a different circuit module than logic circuit module 101, the interconnection is made by means of back panel wiring. The pin connectors for module 101 and for the module which houses circuit 220 are illustrated in FIG. 2 as 217 and 221 respectively.

Circuit 220 is comprised of transistor 226 and transistor 227 connected in a series arrangement between a positive source of voltage connected at 228 and a negative source of voltage connected at 235. The circuit is tapped at connection point 230, where a wire is connected to pin connector 221. When the transistor input 232 is driven in a direction to cause transistor 226 to conduct, and transistor 227 is held in the nonconducting state, a current is caused to flow from the positive voltage supply connected to 228 through transistor 226 to line 219. This current flows into circuit module 101, where it passes through resistor 213 to the negative voltage supply source (−V). The voltage drop across resistor 213 is thus increased, thereby raising the reference voltage value which is connected to reference voltage inputs 203, 208 and other similar reference voltage inputs. If transistor input 234 on circuit 220 is driven in a direction to cause transistor 227 to conduct, and transistor 226 is held in the nonconducting state, a current is caused to flow from the positive voltage supply (+V) in circuit module 101, through resistor 212, line 219, and transistor 227 to the negative voltage source connected to 235 in circuit 220. This current causes the voltage drop across resistor 212 to increase, thereby creating a more negative reference voltage value at the reference voltage inputs. In this manner it can be seen that circuit 220 can be selectively controlled to provide an increase or a decrease in the reference voltage for all circuits housed within circuit module 101. A negative increment to the reference voltage value is referred to as a "high" voltage margin and a positive increment to the reference voltage value is referred to as a "low" voltage margin. It can also be seen that if both transistors 226 and 227 in circuit 220 are held in the nonconducting state no current will flow through line 219 and no incremental reference voltage effect will be present at the reference voltage inputs within circuit module 101.

The means for selectively driving circuit 220 in response to digital computer commands will be more fully described hereinafter. There is preferably one circuit 220 of the type illustrated in simplified form in FIG. 2 for each circuit module 101, with 64 circuits 220 being housed together in a single special circuit module. This number of circuits is sufficient to provide an independent voltage margin connection to each of the 64 circuit modules in a chasses quadrant. It follows that four of these special circuit modules provide sufficient voltage margin circuits for an entire chassis assembly 100. These special circuit modules will hereinafter be referred to as "BH" modules for convenience. Each of the chassis assemblies illustrated in FIG. 1 therefore is subdivided into four quadrants of 64 circuit modules, each quadrant comprising 63 logic circuit modules of the type illustrated as logic circuit module 101 and one BH module.

Figure 3:
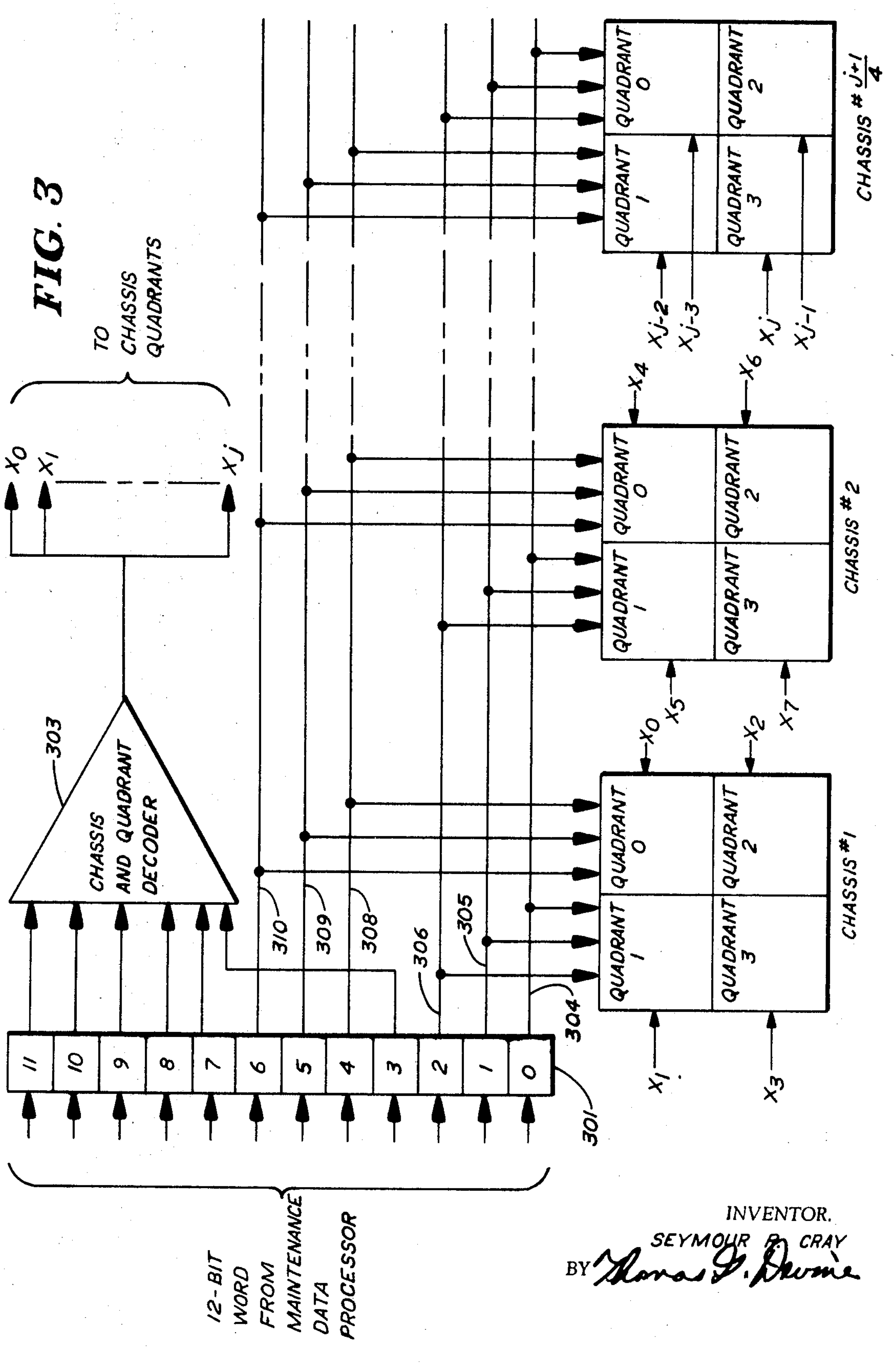
FIG. 3 illustrates a block diagram of an addressing scheme for selecting an individual logic circuit module.

FIG. 3 illustrates a block diagram of a scheme for selecting voltage margin driver circuits associated with particular logic circuit modules for the purposes of varying the reference voltages. Register 301 stores a 12-bit binary word which it receives, in the preferred embodiment, from a special maintenance data processor. For purposes of convenience the register stages in register 301 are numbered from 0 to 11 in FIG. 3. The storage elements comprising register 301 are preferably electronic flip-flop circuits and are well known in the art.

Stages 3 and 7—11 of register 301 are connected to the input of a chassis and quadrant decoder 303. Decoder 303 may be of any design commonly used in the computer art for the purpose of translating an input binary number into a signal which activates one of a plurality of output lines. Decoder 303 has six binary input lines and 64 output lines which may be selectively energized by the various binary input combinations. The output lines are labeled X0, X1, etc., and are each associated with a particular chassis quadrant as illustrated in FIG. 3.

Stages 0, 1, and 2 of register 301 are connected to column select lines 304, 305, and 306 respectively. These column select lines are connected to all chassis assemblies; specifically, lines 304, 305 and 306 are connected to each of the BH modules located on the chassis assemblies. Stages 4, 5 and 6 of register 301 are connected to row select lines 308, 309 and 310 respectively. Lines 308, 309 and 310 are also connected to each BH module located on the chassis assemblies. Therefore, each BH module on the chassis assemblies is wired directly to six stages of register 301 and is receptive to the binary numbers stored by the stages. As will hereinafter be explained the BH module associated with a particular chassis quadrant is wired to be responsive to the binary numbers received over lines 304—306 and 308—310 to activate voltage margin driver circuits associated with the circuit module located at the row number and column number specified by the bits stored in these register stages.

Figure 4:
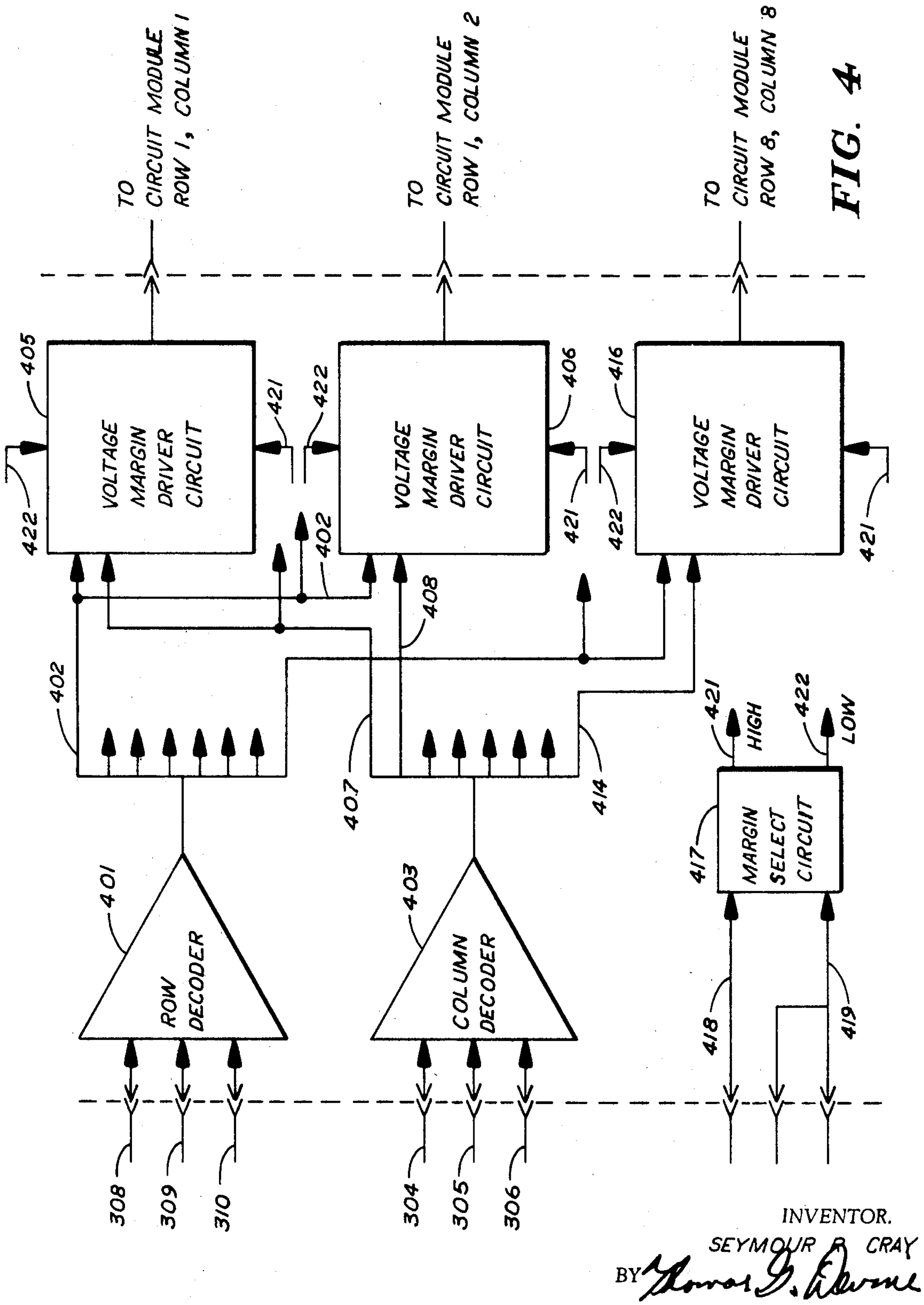
FIG. 4 illustrates further details of the address selection scheme of FIG. 3.

FIG. 4 illustrates in block diagram form a typical BH module. A row decoder 401 is connected via pin connectors to row select lines 308, 309 and 310. Column decoder 403 is connected via a pin connector column select lines 304, 305 and 306. Row decoder 401 and column decoder 403 are decoders commonly used in the computer arts, and are designed to selectively activate one of their eight output lines in response to the binary number representation present at their three input lines. Row decoder 401 is connected via its output line 402 to voltage margin driver circuits 405, (voltage margin driver circuit 405 was represented in simplified form in FIG. 2 as circuit 220) 406 and six other voltage margin driver circuits (not shown) which are associated with circuit modules located in the same row. Column decoder output line 407 is connected to voltage margin driver circuit 405 and seven other voltage margin driver circuits located in the same column (not shown). Likewise, output line 408 is connected to eight voltage margin driver circuits in a common column, one of which is driver circuit 406, and output line 414 is connected to eight voltage margin driver circuits in a common column, one of which is driver circuit 416. Thus it can be seen that each row decoder output line and each column decoder output line is connected to eight voltage margin driver circuits associated with logic circuit modules in a common row or column, and the activation of a single output line form each decoder will result in two signals being received by the voltage margin driver circuit that is connected to the activated row decoder output line and the activated column decoder output line. No other voltage margin driver circuit will receive two such signals, although some will receive a single signal from one decoder or the other. As will hereinafter be described, a voltage margin driver circuit requires both activation signals in order for it to be properly energized.

Also illustrated in FIG. 4 is a margin select circuit 417. This circuit is responsive to a chassis quadrant select signal which it receives via line 418 from one of the outputs of the chassis and quadrant decoder 303, shown in FIG. 3. Margin select circuit 417 is also responsive to an input which it receives over the high/low margin select line 419. Line 419 transfers a signal which originates in the maintenance data processor and indicates whether a high margin test or a low margin test is to be performed. The origination point of this signal is not shown, but would typically be stored in a register or flip-flop element similar to register 301 in FIG. 3. The signal delivered over line 419 is delivered simultaneously to all BH modules. However, only the BH module having a margin select circuit 417 which receives a concurrent signal over the chassis quadrant select line 418 will respond to the high/low margin selection.

Circuit 417 has two output lines, each of which are connected to all of the voltage margin driver circuits contained within the BH module, as illustrated in FIG. 4. The high select lines 421 are activated when a high margin test in indicated by the signal present on line 419, and the low select lines 422 are activated when a low margin select signal is present on input line 419.

Figure 5:
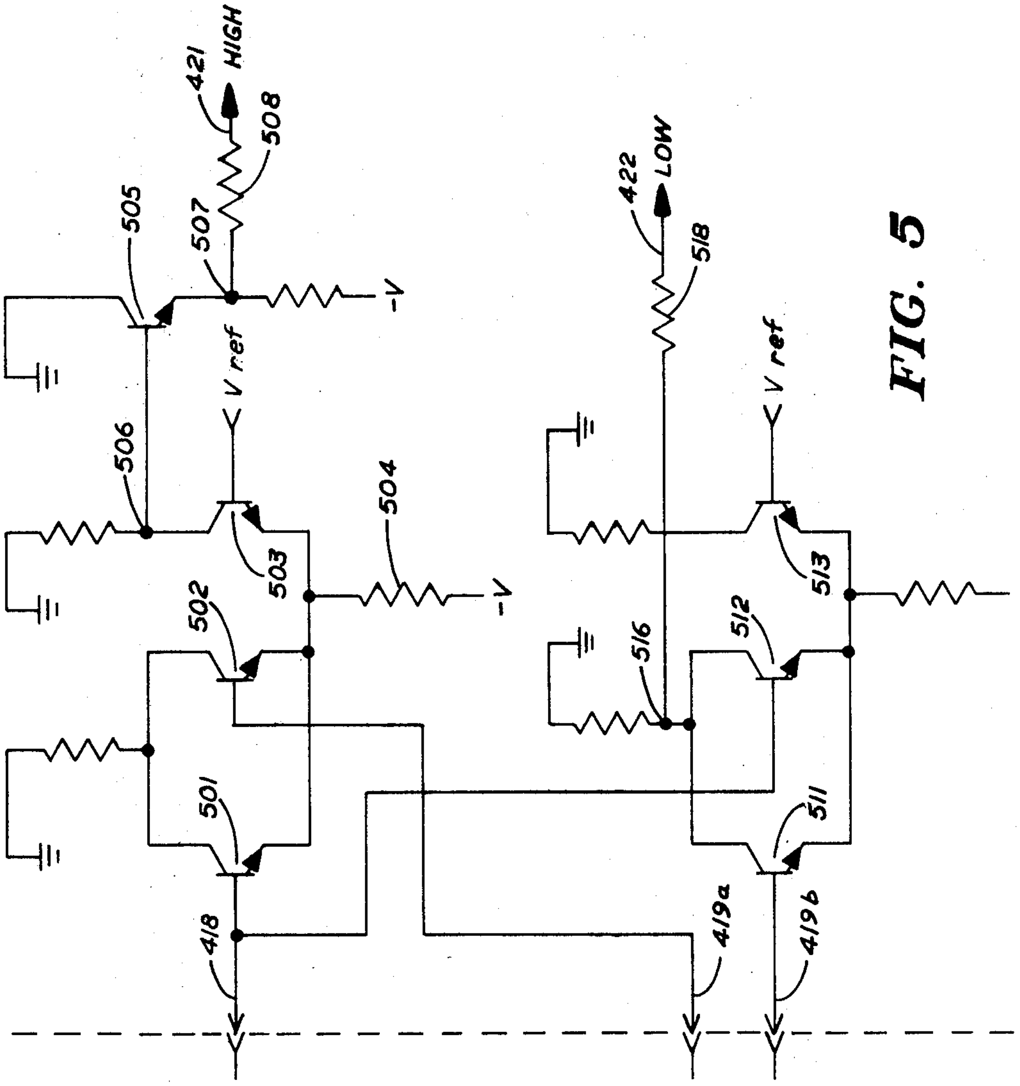
FIG. 5 illustrates the circuit for selecting the reference voltage margin.

FIG. 5 is a circuit schematic diagram of the margin select circuit 417 illustrated in FIG. 4. Transistors 501, 502, and 503 form a conventional current mode logic circuit. Likewise, the transistors 511, 512, and 513 form a second conventional current mode logic circuit. The signals applied to transistors 503 and 513 are reference voltage signals, illustrated as $V_{ref}$ in FIG. 5. Transistors 501 and 502 are connected in a logical AND configuration, assuming that a logical 1 is represented by −1.6 volts and a logical 0 is represented by −0.8 volts. Under this assumption, the parallel current paths formed by transistors 501 and 502 will not be disconnected unless a logical 1 (−1.6 volts) is applied to the input terminals of both transistors. When this condition occurs, the voltage drop across resistor 504 decreases to a value that is determined by the magnitude of the reference voltage $V_{ref}$, and transistor 503 begins conducting. This causes the voltage at output connection 506 to drop, thereby decreasing conduction through transistor 505. When current decreases through transistor 505 the voltage at connection point 507 becomes more negative. This negative voltage is coupled to "high" select line 421 via the current limiting resistor 508.

In summary, the application of a logical 1 signal to both transistors 501 and 502 results in a negative voltage being applied to "high" select line 421; any other combination of logical signals applied to transistors 501 and 502 will result in a voltage of approximately ground potential (0 volts) being applied to "high" select line 421.

The operation of the circuit formed by transistors 511, 512 and 513 can be described in the same way as above with one exception. In this circuit, output connection point 516 is located in the circuit path containing the parallel transistors 511 and 512. Therefore, when a logical 1 signal is applied to both transistors 511 and 512 the voltage at output connection point 516 will approach ground potential and will be coupled to the "low" select line 422 via current limiting resistor 518. Any other combination of logical input signals will yield a negative voltage at output connection point 516 and also on the "low" select line 422.

It should be noted that the references to voltages approaching ground potential above are inexact to the extent that there is always a small resistance drop present. For example, the voltage at connection point 507 when transistor 505 is conducting has been measured at −0.8 volts, and the voltage at connection point 516 when transistors 511 and 512 are not conducting has also been measured at −0.8 volts.

The input lines that control the operation of the margin select circuit illustrated in FIG. 5 are the chassis quadrant select line 418 and the high/low margin select lines **419*a* and 419*b*. Lines 419*a* and 419*b* are typically a twisted pair combination and are always of opposite value in a logic voltage sense. Thus when the signal on line 419*a* is representative of a logical 1, the signal on line 419*b* will be representative of a logical 0. The inverse can also occur but lines 419*a* and 419*b* can never simultaneously have signals representative of the same logical values. The effect of this convention is to cause a negative voltage to be present on one of the select lines 421 or 422 whenever a logical 1 signal appears on the chassis quadrant select line 418. The following table illustrates the voltage values which appear on lines 421 and 422** for the four possible combinations of logic input signals which can occur. This chart assumes a logical 1 as represented by approximately −1.6 volts and a logical 0 is represented by approximately −0.8 volts.

| Input lines | | | Output lines | |
|---|---|---|---|---|
| 418 | 419a | 419b | 421 (high), volt | 422 (low), volt |
| 0 | 1 | 0 | −0.8 | −1.6 |
| 0 | 0 | 1 | −0.8 | −1.6 |
| 1 | 1 | 0 | −1.6 | −1.6 |
| 1 | 0 | 1 | −0.8 | −0.8 |

Figure 6:
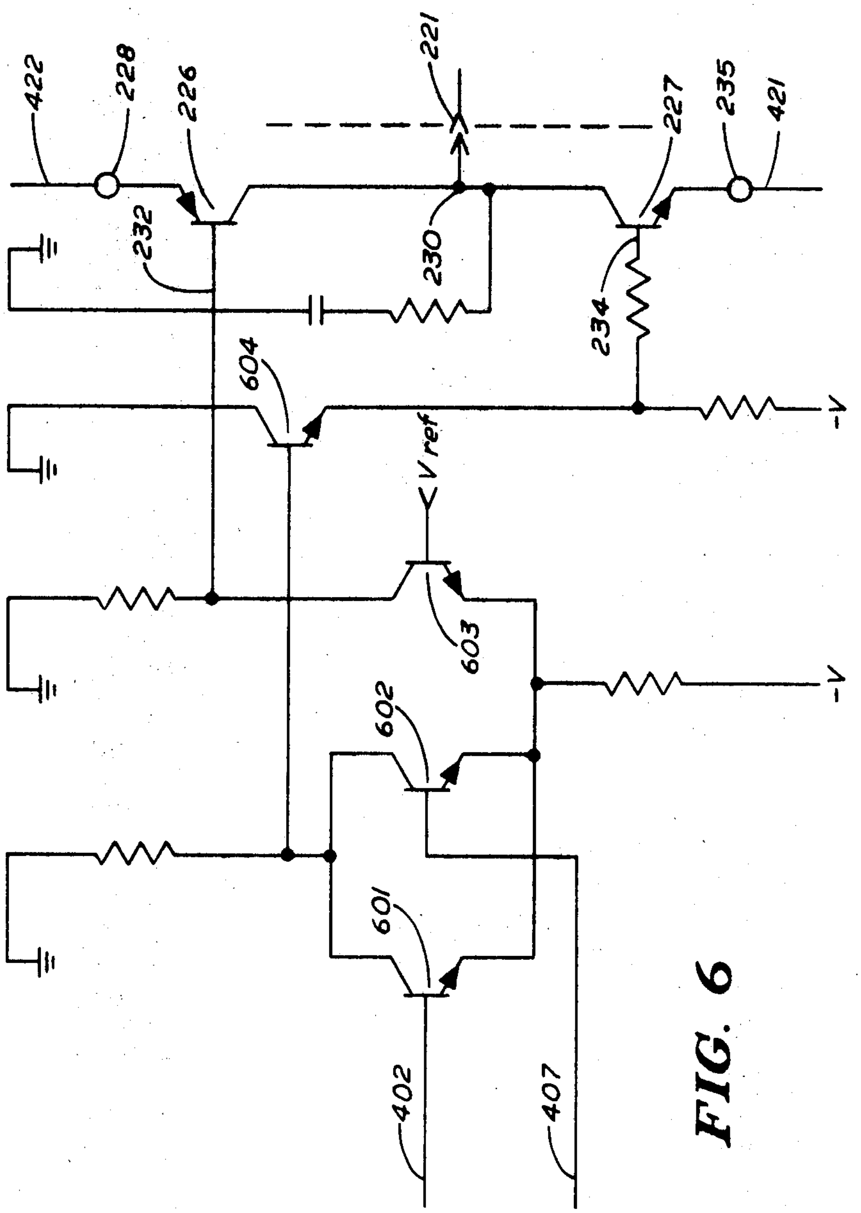
FIG. 6 illustrates a reference voltage margin driver circuit.

FIG. 6 illustrates a voltage margin driver circuit of the type shown in block diagram form in FIG. 4. Wherever possible the reference characters used to explain the simplified voltage margin driver circuit in FIG. 2 are also used to identify corresponding components of the circuit shown in FIG. 6. Transistors 601, 602 and 603 form a conventional current mode logic AND circuit, and will not be explained in detail here. If a row select signal is present on line 402, and a column select signal is present on line 407, transistors 601 and 602 do not conduct and transistors 603 and 604 will be caused to conduct current. Transistor 603 and 604 will tend to cause conduction in transistors 226 and 227 respectively, but the signals on line 421 and 422 from the margin select circuit (417 in FIG. 4) will enable only one of these two transistors to conduct. If the "high" select line 421 is activated (see FIG. 5) connection point 235 will be at approximately −1.6 volts and transistor 227 will conduct. If the "low" select line 422 is activated connection point 228 will be at approximately ground potential (−0.8 volts) and transistor 226 will conduct. In either case, the current conducted by one of these transistors will provide an incremental voltage change to all voltage reference circuits connected to this circuit via pin connector 221.

Figure 7:
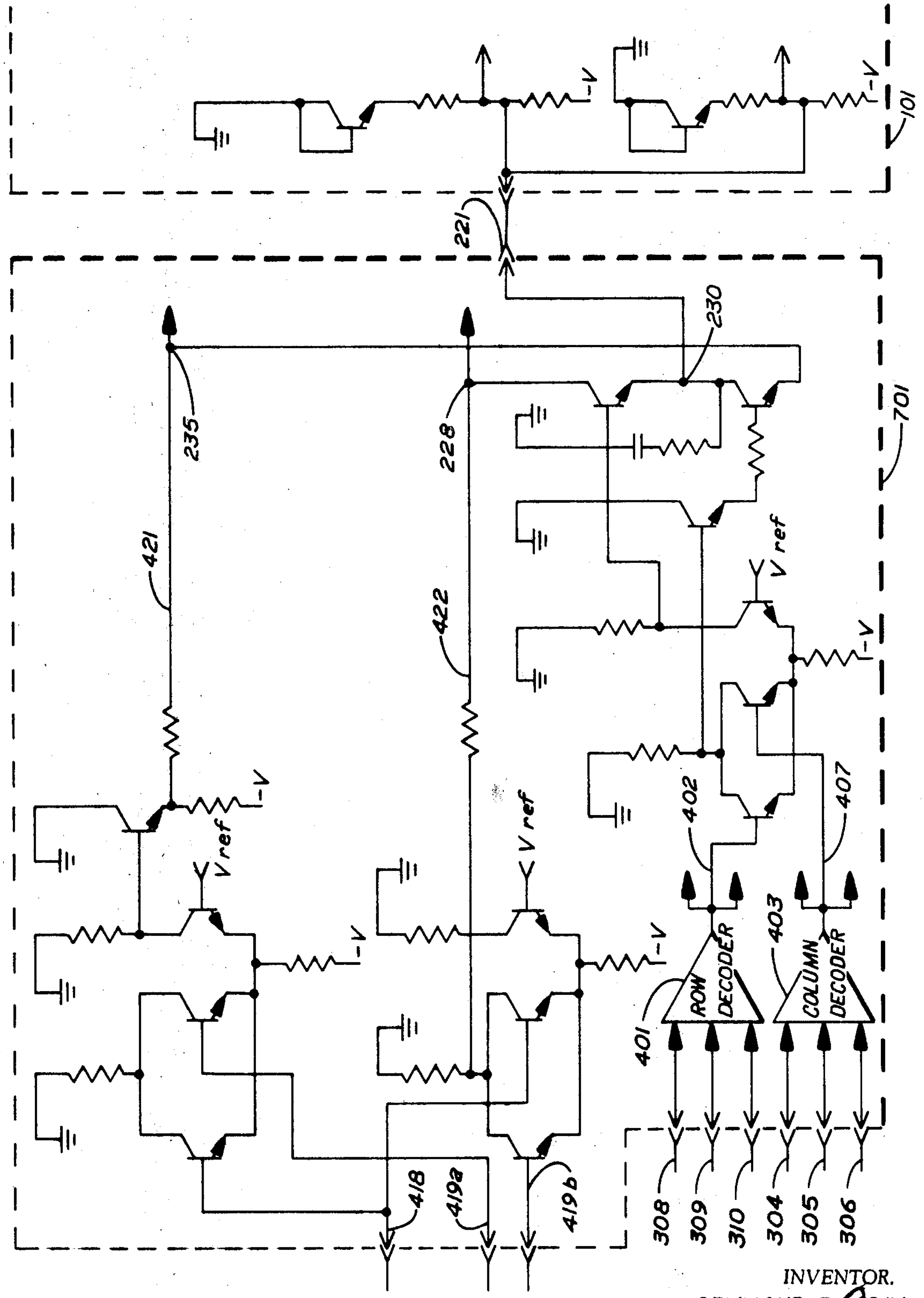
FIG. 7 illustrates the circuits of FIG. 5 and 6 connected to the reference voltage circuit in a typical logic circuit module.

FIG. 7 illustrates the interconnection of the circuits of FIGS. 5 and 6 within a typical BH module 701, and the interconnection of module 701 with the reference voltage circuits of a typical logic circuit module 101. Chassis quadrant select line 418, and high/low margin select lines **419*a* and 419*b* are shown as inputs to the margin select circuit. The outputs from this circuit, "high" select line 421 and "low" select line 422 are shown connected to one of the voltage margin driver circuits at connection points 235 and 228 respectively. Inputs 308, 309, and 310, to row decoder 401 are illustrated in FIG. 7, as are inputs 304, 305, and 306 to column decoder 403. The output line from the voltage margin driver circuit connection point 230 to pin connector 221 is shown, together with the connections to typical reference voltage circuits contained within logic circuit module 101**.

This invention thus provides the circuits whereby a maintenance data processor can selectively adjust the voltage operating margin in any of a plurality of logic modules for the purpose of stressing the operation of the circuits contained within these logic circuit modules. Although a single preferred embodiment of the invention has been herein described, it should be understood that various modifications and alternative embodiments are contemplated within the scope of the present invention. It is therefore to be understood, that within the scope of the appended claims, the invention may be practiced otherwise than as specifically described.

I claim:

1. A computer-controlled apparatus for varying the input signal switching threshold voltage for any of a plurality of electronic switching circuits where said switching circuits have their input signal switching threshold voltage levels determined by connection to reference voltage sources, comprising:

a. a plurality of bidirectional current switching means for connection to the reference voltage sources for increasing and decreasing the reference voltage magnitudes;

b. control means connected to the bidirectional current switching means, for controlling the direction of current flow;

c. selection means connected to the bidirectional current switching means and to the control means, for selectively activating any of the plurality of bidirectional current switching means and the control means;

d. data processing means connected to the selection means for energizing the selection means in response to computer program commands.

2. Apparatus as claimed in claim 1 wherein the selection means further comprises:

a. a first register means for storing numbers representative of the locations of the voltage reference sources;

b. a first decoding means connected to the register means for converting the stored numbers into a plurality of activating signals;

c. connection means for connecting the plurality of activating signals to the bidirectional current switching means.

3. Apparatus as claimed in claim 2 wherein the selection means further comprises:

a. second register means for storing numbers representative of the direction of current flow in the bidirectional current switching means;

b. second decoding means connected to the second register means for converting the stored numbers into directional activating signals for transmission to the control means.

4. Apparatus as claimed in claim 3 wherein each bidirectional current switching means further comprises:

a. first and second transistors connected in a series conducting relationship between a source of positive voltage and a source of negative voltage;

b. conducting means having its first end connected to the common junction point between the first and second transistors, and having its second end connected to at least one of the voltage reference sources;

c. transistor switching means connected to the control elements of the first and second transistors, and responsive to the selection means to selectively cause conduction in the first and second transistors.

5. Apparatus as claimed in claim 4 wherein the data processing means comprise a stored program, binary digital computer.

6. Apparatus for varying the signal switching threshold voltage for any of a plurality of logic circuit modules wherein each logic circuit module has its signal switching threshold voltage level determined from a reference voltage supply provided by tapping a voltage divider network, comprising:

a. current supply means for providing current to said voltage divider tap;

b. current drain means for drawing current from said voltage divider tap;

c. selection means for selectively connecting the current supply means or the current drain means to said voltage divider tap;

d. register means connected to said selection means for storing numbers representative of whether a current supply means or a current drain means is to be connected to the voltage divider tap;

e. means for activating the register means.

7. Apparatus as claimed in claim 6, wherein the means for activating the register means further comprising:

f. data processing means connected to said register means, for selecting one of the plurality of logic circuit modules and a signal switching threshold voltage level in response to its internally operated computer program, and for developing numbers representative of the selected module and voltage level, and transferring these numbers into the register means.